United States Patent
Borgaonkar et al.

(10) Patent No.: US 11,050,461 B2
(45) Date of Patent: Jun. 29, 2021

(54) TOY, METHOD FOR CONTROLLING A TOY, AND COMPUTER PROGRAM PRODUCT

(71) Applicant: NXP B.V., Eindhoven (NL)

(72) Inventors: Swapnil Borgaonkar, Bangalore (IN); Harish Dixit, Bangalore (IN); Sreedhar Patange, Bangalore (IN); Srikanth Dandamudi, Bangalore (IN)

(73) Assignee: NXP B.V., Eindhoven (NL)

( * ) Notice: Subject to any disclaimer, the term of this patent is extended or adjusted under 35 U.S.C. 154(b) by 891 days.

(21) Appl. No.: 15/062,034

(22) Filed: Mar. 4, 2016

(65) Prior Publication Data

US 2016/0261313 A1 Sep. 8, 2016

(30) Foreign Application Priority Data

Mar. 6, 2015 (EP) ..................... 15157964

(51) Int. Cl.
*H04B 5/00* (2006.01)
*G06F 13/10* (2006.01)
*A63H 30/04* (2006.01)
*A63H 3/28* (2006.01)
*A63H 3/00* (2006.01)

(52) U.S. Cl.
CPC ........... *H04B 5/0031* (2013.01); *A63H 30/04* (2013.01); *G06F 13/102* (2013.01); *A63H 3/006* (2013.01); *A63H 3/28* (2013.01); *A63H 2200/00* (2013.01); *Y02D 10/00* (2018.01)

(58) Field of Classification Search
None
See application file for complete search history.

(56) References Cited

U.S. PATENT DOCUMENTS

| 2002/0081937 A1* | 6/2002 | Yamada | A63H 3/48 446/175 |
| 2011/0199194 A1* | 8/2011 | Waldock | B25J 9/1656 340/10.51 |
| 2013/0109267 A1 | 5/2013 | Schweikardt et al. | |
| 2013/0115851 A1 | 5/2013 | Setton | |
| 2013/0217295 A1 | 8/2013 | Karunaratne | |
| 2014/0179446 A1 | 6/2014 | Zuniga et al. | |

(Continued)

FOREIGN PATENT DOCUMENTS

| CN | 101216711 A | 7/2008 |
| CN | 203408474 | 1/2014 |
| WO | 2015/021730 A1 | 2/2015 |

OTHER PUBLICATIONS

Extended European Search Report, U.S. Appl. No. 15/157,964, dated Sep. 3, 2015.

*Primary Examiner* — Idriss N Alrobaye
*Assistant Examiner* — Dayton Lewis-Taylor

(57) ABSTRACT

There is disclosed a toy comprising a central unit and at least one peripheral unit which is operatively coupled to said central unit, wherein the central unit is arranged to establish Near Field Communication (NFC) with the peripheral unit, and wherein the central unit is further arranged to control one or more functions of the peripheral unit in dependence on control data received, via NFC, from said peripheral unit. Furthermore, a corresponding method for controlling a toy and a corresponding computer program product are disclosed.

11 Claims, 2 Drawing Sheets

(56) References Cited

U.S. PATENT DOCUMENTS

| | | |
|---|---|---|
| 2014/0315468 A1 | 10/2014 | Vasquez |
| 2015/0065258 A1* | 3/2015 | Meade .................. A63F 13/235 463/43 |
| 2015/0336276 A1 | 11/2015 | Song et al. |

* cited by examiner

TOY, METHOD FOR CONTROLLING A TOY, AND COMPUTER PROGRAM PRODUCT

CROSS-REFERENCE TO RELATED APPLICATIONS

This application claims the priority under 35 U.S.C. § 119 of European patent application no. 15157964.6, filed on Mar. 6, 2015, the contents of which are incorporated by reference herein.

FIELD

The present disclosure relates to a toy. Furthermore, the present disclosure relates to a corresponding method for controlling a toy and a corresponding computer program product.

BACKGROUND

Today, there are many toys that contain different parts or moving components. For example, a robot may comprise a torso, a movable head, as well as movable arms and legs. Furthermore, such parts or components may perform certain predefined functions. For instance, the arms of a robot may move in a particular predefined direction. Furthermore, other components, such as movable weapons—that may substitute movable arms, for example—may perform functions as producing a predefined light output (e.g. a blinking flashlight) and producing a predefined audio output (e.g. a gun sound) Many more predefined functions may be envisaged (e.g. rotating, vibrating, trembling and buzzing). It is, however, relatively difficult to control such functions.

SUMMARY

There is disclosed a toy comprising a central unit and at least one peripheral unit which is operatively coupled to said central unit, wherein the central unit is arranged to establish Near Field Communication (NFC) with the peripheral unit, and wherein the central unit is further arranged to control one or more functions of the peripheral unit in dependence on control data received, via NFC, from said peripheral unit.

In illustrative embodiments, the central unit comprises an NFC device and at least one NFC antenna, and the NFC device is arranged to establish said NFC via said NFC antenna.

In further illustrative embodiments, the central unit comprises a microcontroller which is arranged to control said functions.

In further illustrative embodiments, the NFC device and the microcontroller are integrated in the same integrated circuit or in the same package.

In further illustrative embodiments, the peripheral unit comprises an NFC tag which contains said control data.

In further illustrative embodiments, at least one function of the peripheral unit comprises a movement prescribed by the control data, and the central unit is arranged to move the peripheral unit as prescribed by said control data.

In further illustrative embodiments, the central unit comprises a motor which is arranged to move said peripheral unit.

In further illustrative embodiments, the central unit comprises an energy source which is arranged to provide energy for moving the peripheral unit.

In further illustrative embodiments, the control data are programmable.

In further illustrative embodiments, the peripheral unit comprises at least one functional component which is arranged to perform or support said function, and the central unit is arranged to control, via said NFC, the functional component in dependence on said control data.

In further illustrative embodiments, the functional component is at least one of a light output device, an audio output device and a motor.

In further illustrative embodiments, the toy comprises at least one further peripheral unit, and the central unit is further arranged to control one or more functions of the further peripheral unit in dependence on said control data.

Furthermore, there is disclosed a method for controlling a toy, said toy comprising a central unit and at least one peripheral unit which is operatively coupled to said central unit, wherein the central unit establishes NFC with the peripheral unit, and wherein the central unit controls one or more functions of the peripheral unit in dependence on control data received, via NFC, from said peripheral unit.

Furthermore, there is disclosed a computer program product comprising executable instructions which, when being executed by a processing unit, cause said processing unit to carry out or control the steps of a method of the kind set forth.

DESCRIPTION OF DRAWINGS

Embodiments will be described in more detail with reference to the appended drawings, in which.

DESCRIPTION OF EMBODIMENTS

Figure 1:
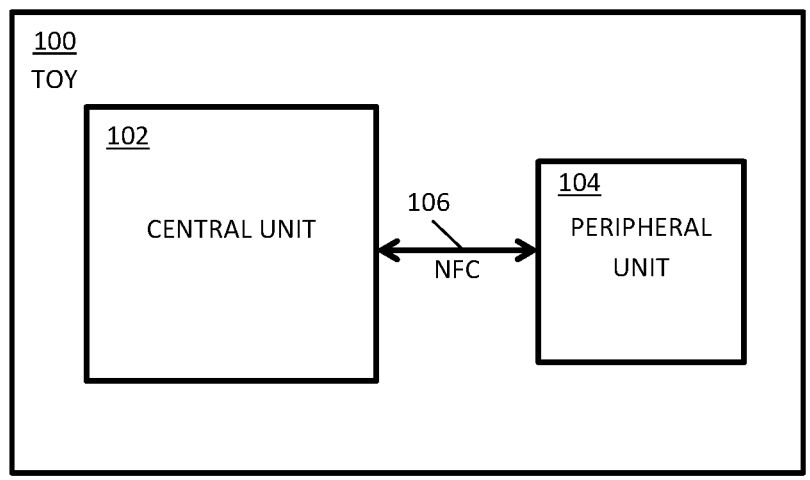
FIG. 1 shows a first illustrative embodiment of a toy.

FIG. 1 shows a first illustrative embodiment of a toy 100 in accordance with the present disclosure. In this embodiment, the toy 100 comprises a central unit 102 and a peripheral unit 104. For example, the toy 100 may be a robot, in which case the central unit 102 may be a torso and the peripheral unit 104 may be a movable arm, i.e. an arm which is movable with respect to said torso. The peripheral unit 104 is operatively coupled to the central unit 102. Furthermore, the central unit 102 is arranged to establish NFC 106 with the peripheral unit 104. Furthermore, the central unit 102 is arranged to control one or more functions of the peripheral unit 104 in dependence on control data received, via NFC, from the peripheral unit 104. In this way, it is easy to control the functions of the peripheral unit 104. In particular, if the toy contains building blocks or bricks which are typically made of plastic (such as LEGO® blocks) it will be difficult to electrically connect the central unit 102 to the peripheral unit 104. Thus, in that case, it will be difficult to control the functions of the peripheral unit 104. If NFC is used, control data may be provided to the central unit 102 even if no electrical connection (e.g. a wired connection) exists between the central unit 102 and the peripheral unit 104, for example.

Figure 2:
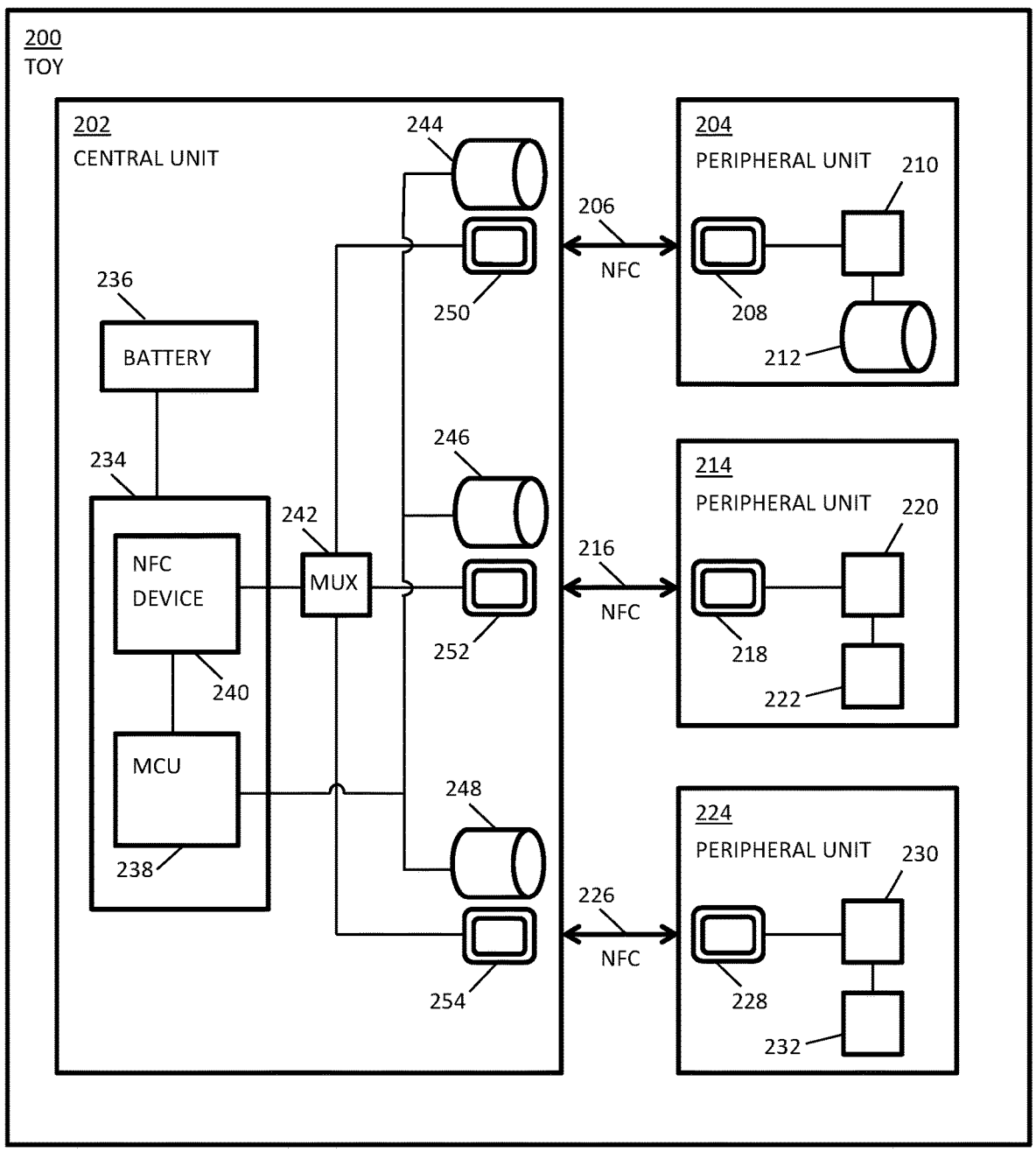
FIG. 2 shows a second illustrative embodiment of a toy.

FIG. 2 shows a second illustrative embodiment of a toy. In particular, it shows a more detailed example embodiment of a toy in accordance with the present disclosure. The toy 200 comprises a central unit 202 and several peripheral units 204, 214, 224. The peripheral units 204, 214, 224 are operatively coupled to the central unit 202. Furthermore, the central unit 202 is arranged to establish NFC 206, 216, 226 with the peripheral units 204, 214, 224. Furthermore, the central unit 202 is arranged to control one or more functions of each peripheral unit 204, 214, 224 in dependence on control data received, via NFC, from the respective peripheral unit 204, 214, 224. In order to establish NFC 206, 216, 226 with the peripheral units 204, 214, 224, the central unit 202 comprises an NFC device 240 connected, through an RF multiplexer 242, to antennas 250, 252, 254. The skilled person will appreciate that, instead of RF multiplexer 242, any other switching or multiplexing mechanism may be used. Also, each peripheral unit 204, 214, 224 comprises an NFC tag integrated circuit (IC) 210, 220, 230 coupled to an antenna 208, 218, 228. The NFC device 240 of the central unit 202 may be a so-called transceiver IC or reader/writer IC operating at 13.56 MHz, which is capable of receiving, via the NFC channels 206, 216, 226 established by means of said antennas 208, 218, 228, 250, 252, 254, control data from the NFC tag ICs 210, 220, 230. Each NFC tag IC 210, 220, 230 may contain predefined control data for the function or functions to be performed by the respective peripheral unit 204, 214, 224, for example, data for controlling a predefined movement of the peripheral unit 204, 214, 224. Furthermore, the central unit 202 comprises a microcontroller 238 which is communicatively coupled to the NFC device 240. In operation, the NFC device 240 may forward the received control data to the microcontroller 238. Then, the microcontroller 238 may use said control data to control one or more motors 244, 246, 248 which are arranged to move the peripheral units 204, 214, 224 to which they are connected. Furthermore, the central unit 236 may contain an energy source, such as a battery 236, which may provide sufficient energy for moving the peripheral units 204, 214, 224. Finally, the peripheral units 204, 214, 224 may contain functional components 212, 222, 232, for enabling additional functions of the peripheral units 204, 214, 224, in addition to the movement caused by the central unit's motors 244, 246, 248. For example, peripheral unit 204 may comprise an additional motor 212, peripheral unit 214 may comprise a buzzer 222, and peripheral unit 224 may comprise a light-emitting diode (LED) 232. In this case, the central unit 202 may, in addition to directly moving the peripheral units 204, 214, 224, by means of motors 244, 246, 248, control the operation of the functional components 212, 222, 232, again via NFC. In particular, the microcontroller 238 may control all functions using the control data received from each peripheral unit 204, 214, 224, thereby facilitating control of a plurality of functions, performed by a variety of peripheral units 204, 214, 224.

Thus, the central unit 202 may comprises an NFC device 240 and at least one NFC antenna 250, 252, 254, and the NFC device 240 may be arranged to establish NFC via said NFC antenna 250, 252, 254. Furthermore, the peripheral units 204, 214, 224 may comprise NFC tag ICs 210, 220, 230—"NFC tags" in short—which contain the control data. These NFC tags may be so-called "passive" tags, i.e. tags which do not have their own energy source. The NFC device 240 of the central unit 202 may be an active NFC device which is powered by a battery 236; through the NFC antennas the NFC device 240 may provide enemy to the NFC tags 210, 220, 230, and to the additional functional components 212, 222, 232 of the peripheral units 204, 214, 224. This configuration may enable energy-efficient yet flexible solution for controlling the functions of the peripheral units 204, 214, 224. Furthermore, the central unit 202 may comprise a microcontroller 238 which is arranged to control said functions; a microcontroller 238 is particularly suitable for controlling the functions of various peripheral units 204, 214, 224 in a coordinated fashion. Furthermore, the NFC device 240 and the microcontroller 238 may be integrated in the same package; thereby, the production cost may be reduced.

As mentioned above, at least one function of the peripheral units 204, 214, 224 may comprise a movement defined by the control data, and the central unit 202 may be arranged to move the peripheral units 204, 214, 224 using said control data. Furthermore, in further illustrative embodiments, the central unit 202 may comprise a motor which is arranged to move said peripheral units 204, 214, 224. Furthermore, the central unit 202 may comprise an energy source 236 which is arranged to provide energy for moving the peripheral units 204, 214, 224. This configuration may enable an energy-efficient, yet flexible solution for controlling movements of the peripheral units 204, 214, 224.

Furthermore, the control data may be programmable. That is to say, the control data may be kept in a writable memory of the NFC tags 210, 22, 230, for example a memory that may be accessed by an external, MT-enabled mobile device (not shown). The external mobile device may comprise a computer program (e.g. a downloadable application or "app") which is capable of creating and/or altering control data, and of writing control data into said memory. Thereby, the functions of the corresponding peripheral units 204, 214, 224 may easily be reprogrammed.

Furthermore, the peripheral units 204, 214, 224, may comprise at least one functional component 212, 222, 232 being arranged to perform or support the function or functions of the respective functional units 204, 214, 224. In that case, the central unit 202 may be arranged to control, via NFC, the functional component 212, 222, 232 in dependence on the received control data. Thereby, since the central unit 202 centrally controls all functions—i.e. also those performed fully or in part by functional components residing in the peripheral units 204, 214, 224—a more coordinated control may be facilitated. For example, the functional components may be a light output device (LED) 232, an audio output device (buzzer) 222 and an additional motor 212 for performing or supporting more fine-grained movements. Other functional components may also be envisaged, for instance sensors, vibrators and actuators. In case several functional units 204, 214, 224 are operatively coupled to (e.g. plugged into sockets of) the central unit 202, the central unit 202 may first perform a polling procedure in order to identify all functional units 204, 214, 224. Subsequently, it may receive control data of the functional units 204, 214, 224, and control their functions in dependence of said control data.

It is noted that the above-described embodiments are merely examples of how a toy in accordance with the present disclosure could be implemented. That is to say, other implementations may also be possible. For example, instead of a transceiver IC or reader/writer IC, the NFC device 240 of the central unit 202 may also be implemented as an emulated NFC card, in which case the peripheral units 204, 214, 224 may contain NFC reader/writer ICs capable of writing control data to the emulated NFC card, for example. In that case, the NFC functionality of the central unit 202 may be implemented largely in software. Furthermore, the peripheral units 204, 214, 224 may contain both an NFC device and a microcontroller, which may enable them to behave as a "central unit" to other peripheral units or sub-units, such that a reconfigurable toy with a central unit and cascaded peripheral units may be realized.

Furthermore, as mentioned above, the toy may comprise at least one further peripheral unit, and the central unit may be further arranged to control one or more functions of the further peripheral unit in dependence on said control data. That is to say, the control data of one peripheral unit may influence the behavior of other peripheral units. For example, attaching a dog's head to the central unit may cause the toy to walk on four legs instead of two legs. Such decision-making intelligence may be implemented in the central unit. In the given example, the central unit may, for instance, in response to the control data received from the peripheral unit "head", decide to control two further peripheral units as legs instead of arms, in addition to other peripheral units which are already controlled as legs.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 toy
102 central unit
104 peripheral unit
106 Near Field Communication
200 toy
202 central unit
204 peripheral unit
206 Near Field Communication
208 antenna
210 NFC tag IC
212 motor
214 peripheral unit
216 Near Field Communication
218 antenna
220 NFC tag IC
222 functional component
224 peripheral unit
226 Near Field Communication
228 antenna
230 NFC tag IC
232 functional component
234 IC package 236 battery
238 microcontroller
240 NFC device
242 RF multiplexer
244 motor
246 motor
248 motor
250 antenna
252 antenna
254 antenna

The invention claimed is:

1. A toy comprising a central unit and at least one peripheral unit which is operatively coupled to said central unit, wherein the central unit is arranged to establish Near Field Communication, NFC, with the peripheral unit, and wherein the central unit is further arranged to control one or more functions of the peripheral unit in dependence on control data received, via NFC, from said peripheral unit,
wherein the peripheral unit comprises an NFC tag which contains said control data;
wherein the central unit comprises an NFC device and at least one NFC antenna, and wherein the NFC device is arranged to establish said NFC via said NFC antenna and said NFC tag, and
wherein the central unit comprises a microcontroller which is arranged to control said functions.

2. The toy as claimed in claim 1, wherein the NFC device and the microcontroller are integrated in the same package.

3. The toy as claimed in claim 1, wherein at least one function of the peripheral unit comprises a movement defined by the control data, and wherein the central unit is arranged to move the peripheral unit using said control data.

4. The toy as claimed in claim 3, wherein the central unit comprises a motor which is arranged to move said peripheral unit.

5. The toy as claimed in claim 3, wherein the central unit comprises an energy source which is arranged to provide energy for moving the peripheral unit.

6. The toy as claimed in claim 1, wherein the control data are programmable.

7. The toy as claimed in claim 1, wherein the peripheral unit comprises at least one functional component which is arranged to perform or support said function, and wherein the central unit is arranged to control, via said NFC, the functional component in dependence on said control data.

8. The toy as claimed in claim 7, wherein the functional component is at least one of a light output device, an audio output device and a motor.

9. The toy as claimed in claim 1, comprising at least one further peripheral unit, wherein the central unit is further arranged to control one or more functions of the further peripheral unit in dependence on said control data.

10. The toy as claimed in claim 1, wherein the central unit is physically connected to the peripheral unit.

11. A method for controlling a toy, said toy comprising a central unit and at least one peripheral unit which is operatively coupled to said central unit, wherein the central unit establishes Near Field Communication, NFC, with the peripheral unit, and wherein the central unit controls one or more functions of the peripheral unit in dependence on control data received, via NFC, from said peripheral unit,
wherein the central unit comprises an NFC device and at least one NFC antenna, and wherein the NFC device is arranged to establish said NFC via said NFC antenna,
wherein the central unit comprises a microcontroller which is arranged to control said functions, and
wherein the peripheral unit comprises an NFC tag which contains said control data.

* * * * *